(12) United States Patent
Gray

(10) Patent No.: US 7,690,230 B2
(45) Date of Patent: Apr. 6, 2010

(54) HOUSING FOR ELECTRONIC LOCK

(75) Inventor: John Steven Gray, Maryville, TN (US)

(73) Assignee: Yake Security Inc., Monroe, NC (US)

( * ) Notice: Subject to any disclaimer, the term of this patent is extended or adjusted under 35 U.S.C. 154(b) by 862 days.

(21) Appl. No.: 11/535,356

(22) Filed: Sep. 26, 2006

(65) Prior Publication Data

US 2008/0076014 A1 Mar. 27, 2008

(51) Int. Cl.
| E05B 47/00 | (2006.01) |
| E05B 65/08 | (2006.01) |
| E05B 65/06 | (2006.01) |
| E05B 43/00 | (2006.01) |
| H05K 5/00 | (2006.01) |

(52) U.S. Cl. ............... 70/277; 70/91; 70/101; 70/271; 361/759

(58) Field of Classification Search ............ None
See application file for complete search history.

(56) References Cited

U.S. PATENT DOCUMENTS

| 4,126,341 | A |   | 11/1978 | Bradstock |
| 4,534,194 | A |   | 8/1985  | Aydin |
| 4,633,687 | A |   | 1/1987  | Fane |
| 4,683,741 | A |   | 8/1987  | Fields |
| 4,802,353 | A |   | 2/1989  | Corder et al. |
| 4,926,664 | A |   | 5/1990  | Gartner et al. |
| 4,929,005 | A |   | 5/1990  | Heinen |
| 4,995,248 | A | * | 2/1991  | Liu ............... 70/107 |
| 5,075,182 | A |   | 12/1991 | Weber |
| 5,337,588 | A | * | 8/1994  | Chhatwal ............ 70/278.3 |
| 5,437,174 | A |   | 8/1995  | Aydin |
| 5,473,922 | A |   | 12/1995 | Bair et al. |
| 5,488,195 | A |   | 1/1996  | Mickel |
| 5,540,069 | A |   | 7/1996  | Muller et al. |
| 5,608,298 | A |   | 3/1997  | Frolov et al. |
| 5,609,051 | A |   | 3/1997  | Donaldson |
| 5,685,182 | A |   | 11/1997 | Chhatwal |
| 5,686,890 | A |   | 11/1997 | Ko |
| 5,841,361 | A | * | 11/1998 | Hoffman ............ 340/5.54 |
| 5,841,637 | A |   | 11/1998 | Chhatwal |
| 5,887,467 | A |   | 3/1999  | Butterweek et al. |

(Continued)

FOREIGN PATENT DOCUMENTS

FR 2734596 2/2007

*Primary Examiner*—Albert W Paladini
*Assistant Examiner*—Dharti H Patel
(74) *Attorney, Agent, or Firm*—Michael G. Johnston; Moore & Van Allen PLLC

(57) ABSTRACT

A housing assembly adapted to fit into a mortised recess in a door is provided for accommodating components of an electronic lock mechanism. The housing assembly comprises a housing including opposed major side walls at least partially defining an opening into the housing. A circuit board comprising electronic circuitry for operating the lock mechanism is disposed in the housing. A bracket for holding batteries is adapted to be disposed in the opening in the housing. The bracket is accessible when the housing is in the mortised recess of the door such that the bracket is movable relative to the housing between a first position and a second position. In the first position the bracket is in the housing and in the second position the bracket is at least partially outside of the housing such that batteries may be inserted into or removed from the bracket.

1 Claim, 5 Drawing Sheets

U.S. PATENT DOCUMENTS

| | | | |
|---|---|---|---|
| 5,923,264 A * | 7/1999 | Lavelle et al. | 340/5.64 |
| 5,979,754 A | 11/1999 | Martin et al. | |
| 5,987,818 A | 11/1999 | Dabideen | |
| 6,117,575 A | 9/2000 | Dinsdale | |
| 6,145,353 A | 11/2000 | Doucet | |
| 6,216,502 B1 | 4/2001 | Cannella et al. | |
| 6,298,699 B1 | 10/2001 | Gartner et al. | |
| 6,580,355 B1 | 6/2003 | Milo | |
| 6,714,118 B1 | 3/2004 | Frolov et al. | |
| 6,750,568 B2 | 6/2004 | Ohara | |
| 6,876,293 B2 | 4/2005 | Frolov et al. | |
| 6,967,562 B2 | 11/2005 | Menard et al. | |
| 7,010,946 B2 * | 3/2006 | Hahn | 70/111 |
| 7,010,947 B2 | 3/2006 | Milo | |
| 2003/0024288 A1 | 2/2003 | Gokcebay et al. | |
| 2003/0214384 A1 | 11/2003 | Milo | |
| 2004/0237609 A1 | 12/2004 | Hosselet | |
| 2004/0261478 A1 | 12/2004 | Conforti | |

* cited by examiner

HOUSING FOR ELECTRONIC LOCK

BACKGROUND

This invention relates generally to electronic locks for doors, and more particularly to a housing assembly for an electronic lock for accommodating the electronics and power supply of the electronic lock.

Electronic locks for doors and exit device trim are generally of two types: those with the electronics and a power supply housed in a mortise assembly, a mortise-type lock, or in an escutcheon assembly, an escutcheon-type lock. A mortise assembly includes a rectangular housing, or case, which is designed to fit into a mortised recess formed in an edge of a door which is opposite to the edge of the door that is hinged to a door frame. When used in a mortise assembly, the electronics and power supply components are usually positioned to reduce the size of the pocket required in the door either vertically and/or horizontally. The mortise pocket is generally of a unique size that is specific to the electronics housing used. This presents an undesirable condition to door manufacturers and installers who must create a unique mortise geometry for each product. Moreover, maintenance of the lock, including simple replacement of the batteries, cannot be accomplished without opening the mortise lock case, making routine tasks complicated and difficult.

When the electronics and power supply are used in an escutcheon, the components are installed within an escutcheon housing, or trim plate, on the outside of the door. The aesthetics are less than desirable since the housing necessarily projects farther from the door surface and generally is positioned above the lock trim or exit device. This positioning can preclude the use of auxiliary hardware, and is inherently less vandal resistant by its visibility and accessibility on the surface of the door.

For the foregoing reasons, there is a need for an arrangement for an electronic lock which is less complicated and more convenient than conventional locks. Ideally, the new arrangement allows ready field maintenance of the electronic components after the lock is installed in a door.

SUMMARY

According to the present invention, a housing assembly adapted to fit into a mortised recess formed in an edge of a door is provided for accommodating components of an electronic lock mechanism, including the electronic circuitry for operating the lock mechanism. The housing assembly comprises a housing including opposed major side walls at least partially defining an opening into the housing. A circuit board comprising electronic circuitry for operating the lock mechanism is disposed in the housing. A bracket for holding batteries is adapted to be disposed in the opening in the housing. Means are provided for electrically connecting the bracket and the circuit board. The bracket is accessible when the housing is in the mortised recess of the door such that the bracket is movable relative to the housing between a first position and a second position so that in the first position the bracket is in the housing and in the second position the bracket is at least partially outside of the housing such that batteries may be inserted into or removed from the bracket.

BRIEF DESCRIPTION OF THE DRAWINGS

For a more complete understanding of the present invention, reference should now be had to the embodiments shown in the accompanying drawings and described below.

DESCRIPTION

The electronics housing assembly according to the present invention may be used with any conventional electronic lock assembly such as, for example, a mortise lock and an escutcheon type lock. Accordingly, detailed explanations of the functioning of all of the electronic lock components are deemed unnecessary for understanding of the present invention by one of ordinary skill in the art.

Figure 1:
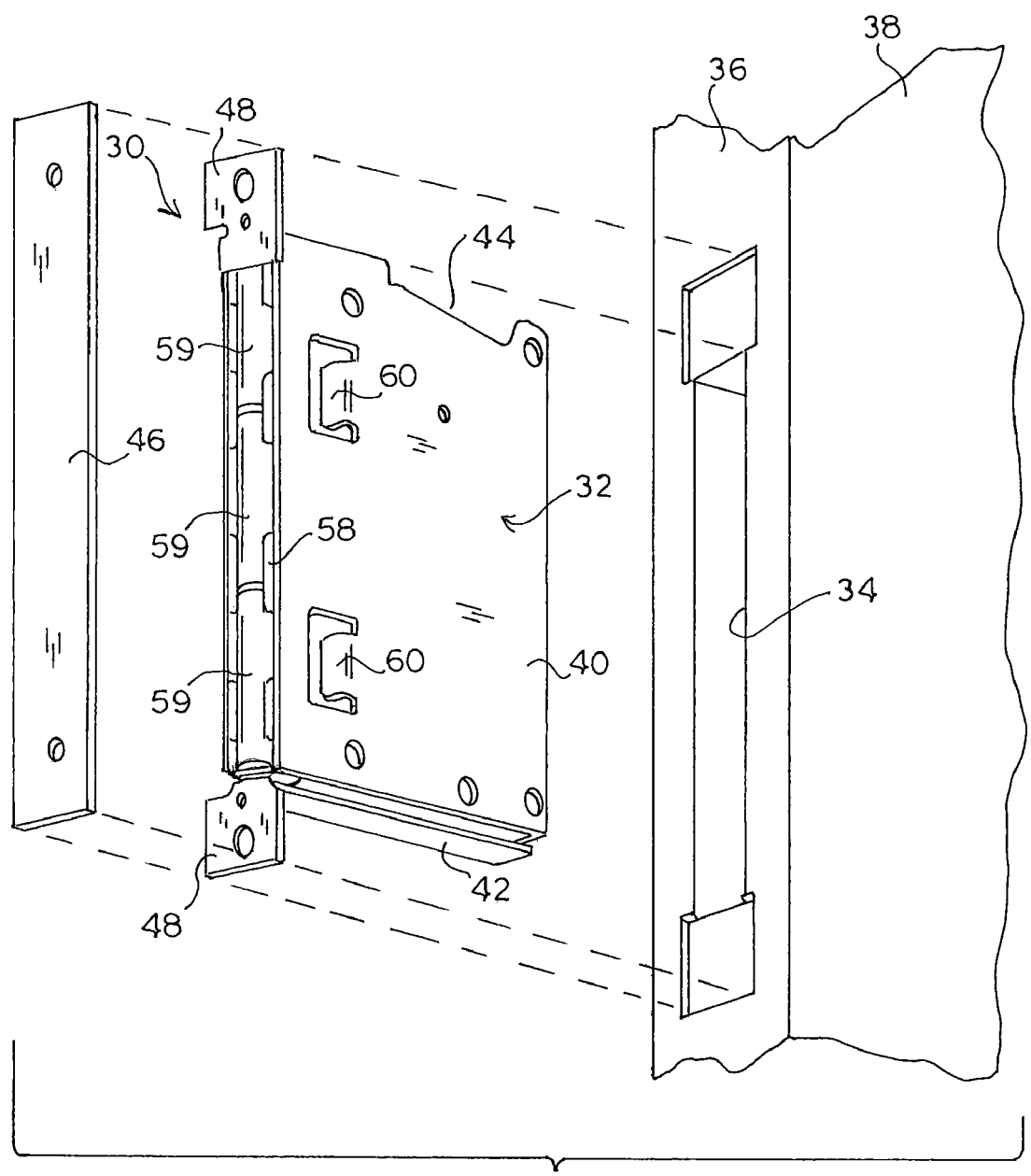
FIG. 1 is an exploded perspective view of an embodiment of an electronics housing assembly according to the present invention.

Referring now to FIG. 1, a first embodiment of an electronics housing assembly according to the present invention is shown and is generally designated by reference numeral 30. The housing assembly 30 comprises a generally rectangular box, or case 32, for housing the electronic components. The case 32 includes two major side walls 40, 44 and an integral bottom wall 42 and a rear wall. The front of the case 32 and two vertically extending tabs 48 define a rectangular opening 45 in the front of the case 32. A face plate 46 is adapted to be secured to upper and lower tabs 48 with screws. As shown in FIG. 1, the case 32 is adapted to be received within a mortise 34 in the free, or unhinged, edge 36 of a door 38.

Figure 2:
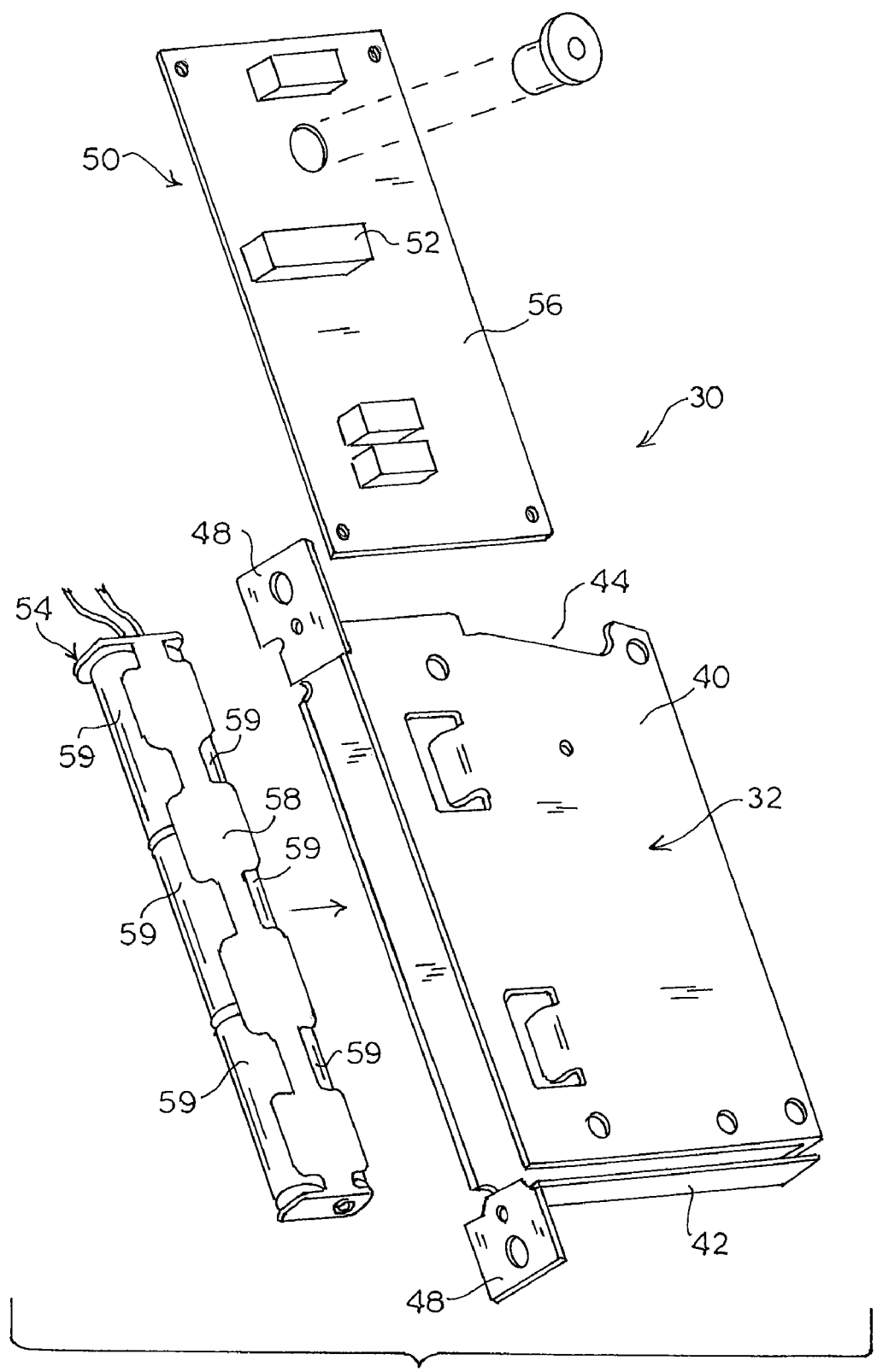
FIG. 2 is an exploded perspective view of the electronics housing assembly shown in FIG. 1.

An example of the electronic components for use in the electronics housing assembly 30 of the present invention is shown in FIG. 2 and designated generally at 50. The electronic components 50 comprise a circuit board 52 and an electrical power supply unit in the form of a multi-battery pack 54. The circuit board 52 is a conventional circuit board upon which the electronic circuitry of the electronically operated lock mechanism is mounted. The circuit board 52 and the other electronic components of the electronic circuitry are affixed to the surface of a metallic plate 56.

The battery pack 54 comprises a battery bracket 58 adapted to accommodate six AA batteries 59, three on each side of the bracket 58. The circuit board 52 and the other electronic components of the electronic circuitry are powered by batteries 59. Electrical power connection to the printed circuit board 70 is facilitated by two wires extending from the battery bracket 58.

Figure 3:
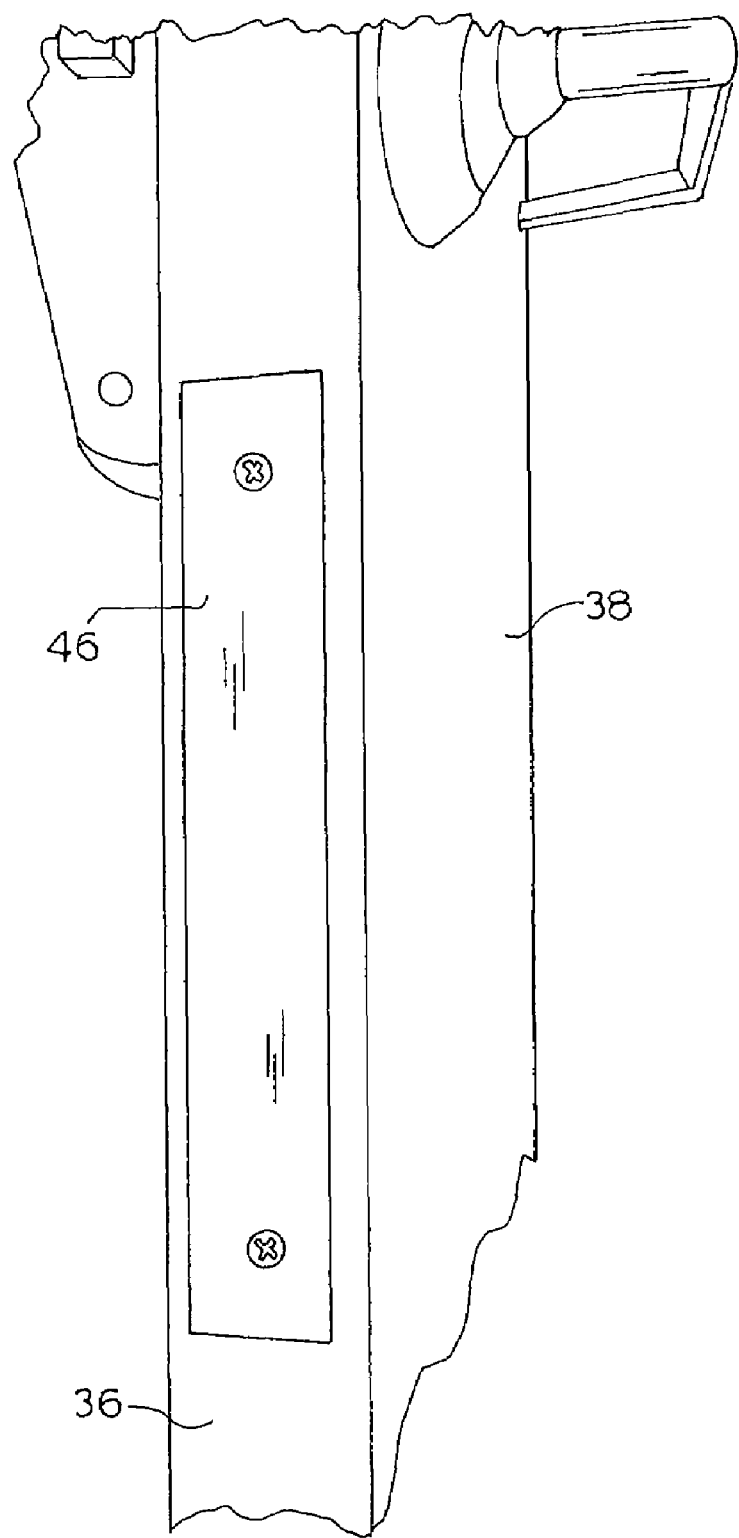
FIG. 3 is a perspective view of the electronics housing assembly according to the present invention installed within a mortise in a door.
Figure 4:
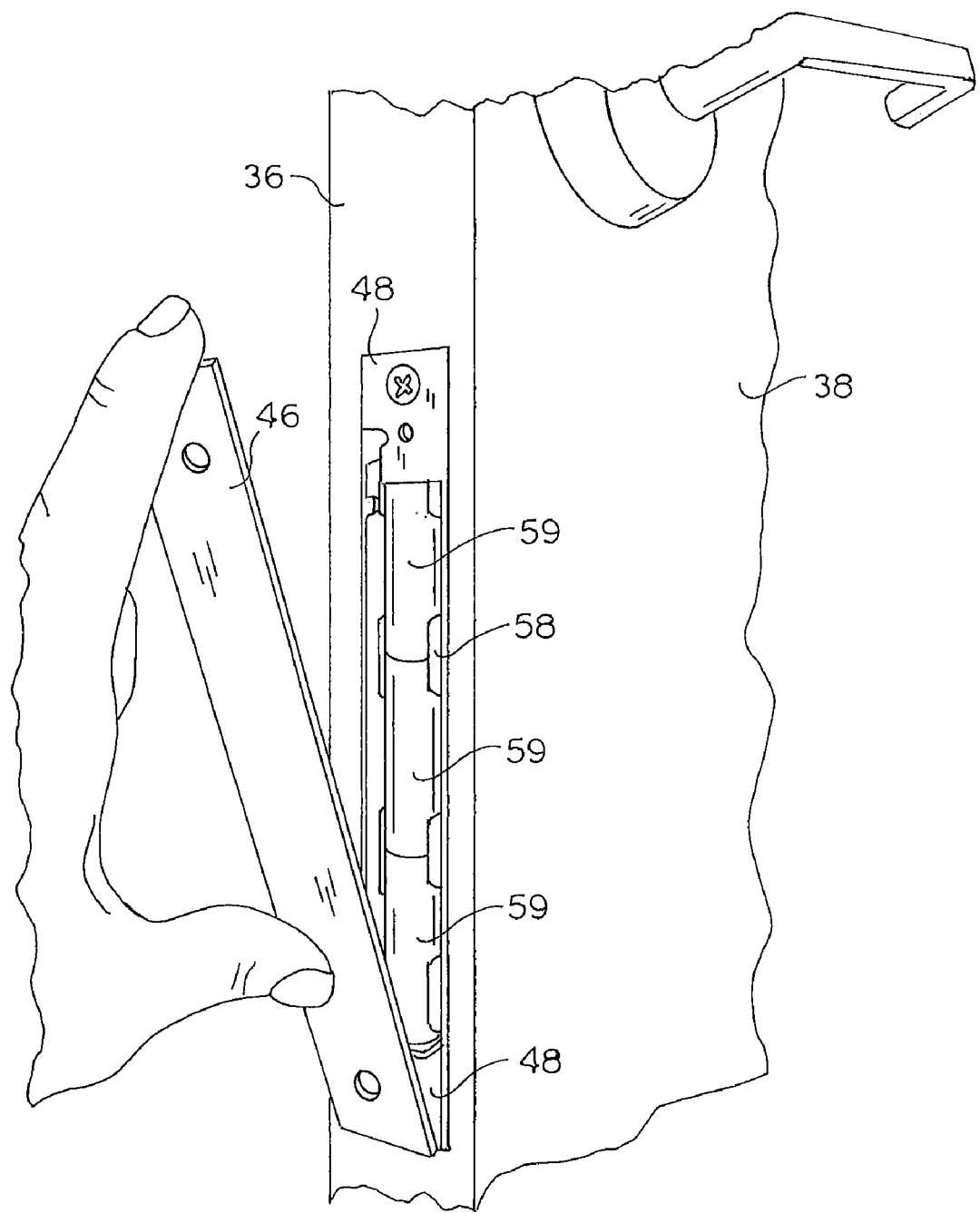
FIG. 4 is a perspective view of the electronics housing assembly as shown in FIG. 3 showing removal of the trim plate to access the battery pack.
Figure 5:
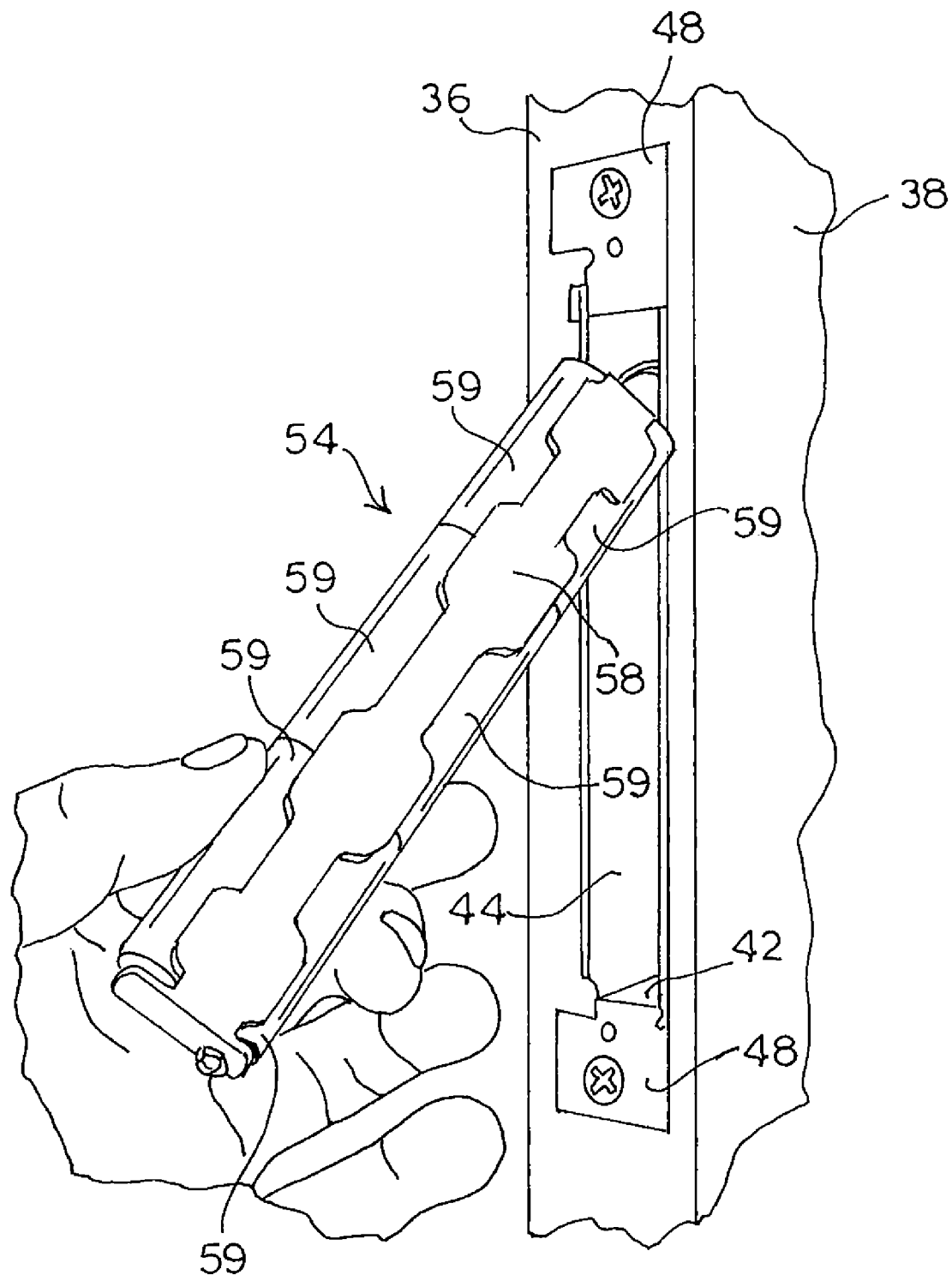
FIG. 5 is a perspective view of the electronics housing assembly as shown in FIG. 3 showing removal of the battery pack.

The battery pack 54 is mounted in the front opening 45 of the case 32 adjacent to the circuit board 52. The length of the bracket 58 is slightly greater than the height of the front opening 45 of the case 32, which helps retain the battery pack 54 within the case 32 immediately adjacent to the front opening 45 of the case 32. Inwardly extending tongue portions 60 are punched into the case 32 at a point spaced from the front opening 45 of the case 32. The inner edge of the battery pack 54 engages the tongue portions 60 for firmly supporting the battery pack 54 within the case 32. With the battery pack 54 inside the case 32 and the case 32 within the mortise 34, the face plate 46 is securely attached to the tabs 48 for enclosing the electronic lock circuitry within the edge 36 of the door 38 (FIG. 3). A suitable low voltage wire (not shown) can extend through any hole in the case 32 for electrically connecting the electronic components to the door lock. The wire may be provided with a polarized plug and socket connectors allowing modular assembly of the components.

In order to replace the batteries 59, the battery pack 54 is removable from the opening 45 in the front of the case 32. It is first necessary to remove the face plate 46 from the tabs 48 to expose the front of the case 32 and rendering the battery pack accessible through the opening 45 in the front of the case 32. Since the battery pack 54 is slightly longer than the height of the opening 45 in the case 32, the battery pack 54 must first be tilted with respect to the case in order to clear the upper tab 48. The battery pack 54 may then be manually pulled from the case 32. The batteries 59 are now accessible via the opposed slots defined by the bracket 54. The user manually depresses the batteries 59 against the force of the coil contact springs (not shown) in the base of the battery bracket 58 for removing the batteries 59. Rotating the bracket 58 exposes the batteries 59 on the rear of the bracket.

The bracket is inserted into the case 32 in the reverse order as described above. First, the upper end of the bracket 54 is inserted into the case 32 behind the upper 48 and lower end of the bracket 54 moved into the opening 45 until the inner edge of the bracket 54 and inner batteries are positioned adjacent the supporting tongue portions 60. Because the battery bracket 54 can pivot and move inwardly with respect to the case 32, the battery pack 54 is easily manipulated during removal and reinsertion. When the battery pack 54 is again in the case 32, the face plate 56 is reattached.

Thus, in use, the electronics housing assembly according to the present invention provides a secure environment for the electronic components of a door-installed electronically operated lock mechanism. Further, it is understood that the electronics housing assembly may be configured to be installed within either a mortise in the door stile or in an escutcheon housing mountable to the exterior of the door.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, the electronics housing assembly may be useful with any electronically operated mechanism remote from the housing assembly. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A housing assembly adapted to fit into a mortised recess formed in an edge of a door for accommodating components of an electronic lock mechanism including the electronic circuitry for operating the lock mechanism, the housing assembly comprising:
   a housing including opposed major side walls at least partially defining an opening into the housing;
   a circuit board disposed in the housing, the circuit board comprising electronic circuitry for operating the electronic lock mechanism;
   a bracket for holding batteries, the bracket adapted to be disposed in the opening in the housing; and
   means for electrically connecting the bracket and the circuit board,
wherein the bracket is accessible when the housing is in the mortised recess of the door, the bracket movable relative to the housing between a first position and a second position so that in the first position the bracket is in the housing and in the second position the bracket is at least partially outside of the housing such that batteries may be inserted into or removed from the bracket.

* * * * *

UNITED STATES PATENT AND TRADEMARK OFFICE
CERTIFICATE OF CORRECTION

| | |
|---|---|
| PATENT NO. | : 7,690,230 B2 |
| APPLICATION NO. | : 11/535356 |
| DATED | : April 6, 2010 |
| INVENTOR(S) | : John Steven Gray |

Page 1 of 1

It is certified that error appears in the above-identified patent and that said Letters Patent is hereby corrected as shown below:

Title page, item (73): "Yake Security Inc., Monroe, NC (US)" should be --Yale Security Inc., Monroe, NC (US)--

Signed and Sealed this

Sixth Day of July, 2010

David J. Kappos
*Director of the United States Patent and Trademark Office*